United States Patent
Hirukawa (10) Patent No.: US 12,272,793 B2
(45) Date of Patent: Apr. 8, 2025

(54) METHOD FOR MANUFACTURING SECONDARY BATTERY

(71) Applicant: Prime Planet Energy & Solutions, Inc., Tokyo (JP)

(72) Inventor: Tomofumi Hirukawa, Nisshin (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 559 days.

(21) Appl. No.: 17/672,607

(22) Filed: Feb. 15, 2022

(65) Prior Publication Data

US 2022/0263139 A1    Aug. 18, 2022

(30) Foreign Application Priority Data

Feb. 17, 2021  (JP) .................. 2021-023562

(51) Int. Cl.
*H01M 10/0585* (2010.01)
*H01M 4/02* (2006.01)

(52) U.S. Cl.
CPC .. *H01M 10/0585* (2013.01); *H01M 2004/025* (2013.01)

(58) Field of Classification Search
CPC ................................ H01M 10/0585
See application file for complete search history.

(56) References Cited

U.S. PATENT DOCUMENTS

| | | | |
|---|---|---|---|
| 4,054,726 A * | 10/1977 | Sauer | H01M 12/06 429/406 |
| 6,444,357 B1 | 9/2002 | Kambe et al. | |
| 2004/0070921 A1 | 4/2004 | Ikeda et al. | |
| 2009/0042097 A1 * | 2/2009 | Fujikawa | H01M 4/0421 429/129 |
| 2009/0136842 A1 * | 5/2009 | Hirota | H01M 10/0585 429/178 |

(Continued)

FOREIGN PATENT DOCUMENTS

| CN | 103988357 A | 8/2014 |
|---|---|---|
| EP | 0967672 A1 | 12/1999 |

(Continued)

OTHER PUBLICATIONS

English Language Abstract of JP 09022703A (Jul. 17, 2024) (Year: 2024).*

(Continued)

*Primary Examiner* — Matthew J Merkling
(74) *Attorney, Agent, or Firm* — HAUPTMAN HAM, LLP (57) ABSTRACT

The manufacturing method herein disclosed includes a forming step of stacking a positive electrode sheet including a positive electrode active material layer on a positive electrode collector, a negative electrode sheet including a negative electrode active material layer on a negative electrode collector, and a separator sheet, thereby forming an electrode body; a constructing step of accommodating the electrode body in a battery case, and pouring an electrolyte into the battery case, thereby constructing a battery assembly; and a charging step of charging the battery assembly. At least any one of the positive electrode active material layer and the negative electrode active material layer has an undulating shape in a stacking direction, and a pit depth of the undulation is 10 μm or more.

3 Claims, 4 Drawing Sheets

(56) References Cited

U.S. PATENT DOCUMENTS

| | | |
|---|---|---|
| 2010/0279158 A1 | 11/2010 | Kumakari et al. |
| 2011/0014510 A1 | 1/2011 | Miyahisa et al. |
| 2011/0039140 A1 | 2/2011 | Miyahisa et al. |
| 2011/0091754 A1 | 4/2011 | Miyahisa et al. |
| 2014/0322579 A1 | 10/2014 | Mitsuhashi et al. |
| 2017/0331144 A1 | 11/2017 | Oguni et al. |

FOREIGN PATENT DOCUMENTS

| | | | |
|---|---|---|---|
| JP | 09022703 A * | 1/1997 | |
| JP | 200135484 A | 2/2001 | |
| JP | 200168085 A | 3/2001 | |
| JP | 2001357836 A | 12/2001 | |
| JP | 200215764 A | 1/2002 | |
| JP | 2004153259 A | 5/2004 | |
| JP | 2004207253 A | 7/2004 | |
| JP | 200593375 A | 4/2005 | |
| JP | 2014212006 A | 11/2014 | |
| JP | 201658181 A | 4/2016 | |
| JP | 2017220450 A | 12/2017 | |
| KR | 1020050121899 A | 12/2005 | |
| WO | 2008053880 A1 | 5/2008 | |
| WO | 2010082257 A1 | 7/2010 | |
| WO | 2010082259 A1 | 7/2010 | |
| WO | 2010082260 A1 | 7/2010 | |
| WO | WO-2019017668 A1 * | 1/2019 | ............ H01M 10/04 |

OTHER PUBLICATIONS

Machine Translation of WO 2019017668 A1 (Jul. 17, 2024) (Year: 2024).*

* cited by examiner

METHOD FOR MANUFACTURING SECONDARY BATTERY

CROSS REFERENCE TO RELATED APPLICATIONS

The present application claims the priority based on Japanese Patent Application No. 2021-023562 filed on Feb. 17, 2021, the entire contents of which are incorporated by reference in the present specification.

BACKGROUND

1. Technical Field

The present disclosure relates to a method for manufacturing a secondary battery.

2. Description of the Background

Generally, with a secondary battery such as a lithium ion secondary battery, a part of the electrolyte (e.g., a nonaqueous electrolyte) is decomposed during initial charging, and a film including the decomposed product thereof (i.e., a Solid Electrolyte Interface film, which will be hereinafter referred to as a SEI film) is formed on the surface of a negative electrode active material layer. The SEI film plays a role of protecting the negative electrode active material layer, and stabilizing the interface between the negative electrode active material layer and the nonaqueous electrolyte, which can improve the durability (e.g., the cycle characteristic) of the battery.

With a secondary battery including an electrode body in which a positive electrode sheet, a negative electrode sheet, and a separator sheet are stacked one on another, for forming the secondary battery, an electrolyte is poured into the battery case accommodating the electrode body therein to impregnate the electrode body with the electrolyte. Herein, the electrode body has been increasing in size in accordance with an increase in capacity of the secondary battery. Accordingly, the time required for impregnating the electrode body with the electrolyte tends to elongate.

Examples of the prior art technology relating to the impregnation of the electrode body with the electrolyte may include Japanese Patent Application Publication No. 2001-35484. Japanese Patent Application Publication No. 2001-35484 discloses as follows: in order to reduce the time during which the electrode body is impregnated with the electrolyte, an uncoated part to be a slit-shaped gap is provided in the active material layer of the electrode forming the electrode body. Further, Japanese Patent Application Publication No. 2014-212006 discloses negative electrode collector copper foil in which a plurality of pits are formed, as the passages for the electrolyte, at a portion opposed to the negative electrode active material layer. Further, examples of other literature for disclosing the impregnation of the electrolyte may include Japanese Patent Application Publication No. 2016-58181, WO 2010/082257, WO 2010/082259, WO 2010/082260, Japanese Patent Application Publication No. 2001-357836, and Japanese Patent Application Publication No. 2001-68085.

SUMMARY

However, with the technology described in Japanese Patent Application Publication No. 2001-35484, provision of the uncoated part reduces the proportion that the active material layer occupies in the electrode. Namely, the porosity of the whole electrode increases, and the capacity density of the electrode body decreases. Further, with Japanese Patent Application Publication No. 2014-212006, provision of pits in the collector undesirably reduces the strength of the collector.

The present disclosure has been completed in view of the foregoing circumstances. It is a main object of the present disclosure to provide a method for manufacturing a secondary battery improved in impregnation rate of the electrolyte to the electrode body without reducing the proportion that the active material layer occupies in the electrode.

The present disclosure provides a method for manufacturing a secondary battery. The manufacturing method includes: a forming step of stacking a positive electrode sheet including a positive electrode active material layer on a long positive electrode collector, a negative electrode sheet including a negative electrode active material layer on a long negative electrode collector, and a long separator sheet, thereby forming an electrode body; a constructing step of accommodating the electrode body in a battery case, and pouring an electrolyte into the battery case, thereby constructing a battery assembly; and a charging step of charging the battery assembly. At least before the constructing step, at least any one of the positive electrode active material layer and the negative electrode active material layer has an undulating shape in a stacking direction, and a pit depth of the undulation is 10 μm or more.

With the configuration, in the constructing step, at least any one of the positive electrode active material layer and the negative electrode active material layer has an undulating shape in the stacking direction, and the pit depth of the undulation is 10 μm or more. For example, in the case where the positive electrode active material layer has the undulating shape, when separator sheets are arranged above and below in the stacking direction, although the separator sheet and the positive electrode active material layer come in contact with each other, the pit portions of the undulation do not come in contact with the separator sheet. Namely, the pit portions of the undulation and the separator sheet form a passage for allowing the electrolyte to pass therethrough. For this reason, the poured electrolyte is more rapidly impregnated into the whole of the positive electrode active material layer. Herein, although the positive electrode active material layer has an undulating shape, the proportion of the positive electrode active material layer per unit area of the positive electrode collector is roughly uniform throughout the whole thereof, so that a sufficient capacity can be ensured.

In accordance with one preferable aspect of the manufacturing method herein disclosed, the manufacturing method further includes: a binding step of binding the battery assembly charged under a prescribed pressure in the stacking direction, and reducing the pit depth of the undulation. For example, when the positive electrode active material layer has the undulating shape, in the binding step, the pit depth of the undulation is shallowed, which can make uniform the distance between the positive electrode active material layer and the negative electrode active material layer, and can reduce the uneven reaction.

In accordance with one preferable aspect of the manufacturing method herein disclosed, in the binding step, the prescribed pressure is a pressure for flattening a surface of the positive electrode active material layer and/or the negative electrode active material layer having the undulating shape. By eliminating the undulating shape, it is possible to make more even the distance between the positive electrode active material layer and the negative electrode active material layer, and to more reduce the uneven reaction.

In accordance with one preferable aspect of the manufacturing method herein disclosed, the pit depth of the undulation is 40 μm or more. As a result of this, it is possible to impregnate the electrode body with the electrolyte more rapidly.

DETAILED DESCRIPTION

Below, referring to the accompanying drawings, preferable embodiments of the technology herein disclosed will be described. Incidentally, matters necessary for executing the technology herein disclosed, except for matters specifically referred to in the present specification (e.g., a general configuration and a manufacturing process of a battery not characterizing the technology herein disclosed) can be grasped as design matters of those skilled in the art based on the related art in the present field. The present disclosure can be executed based on the contents disclosed in the present specification, and the technical common sense in the present field.

Incidentally, in the present specification, the term "battery" is a term denoting an electric storage device capable of extracting the electric energy in general, and is a concept including a primary battery and a secondary battery. Further, in the present specification, the term "secondary battery" is a term denoting an electric storage device capable of repeatedly charging and discharging in general, and a concept including a so-called storage battery (chemical battery) such as a lithium ion secondary battery or a nickel hydrogen battery, and a capacitor (physical battery) such as an electric double layer capacitor. Below, as one example of the method for manufacturing a secondary battery, the present technology will be described by taking a method for manufacturing a lithium ion secondary battery as an example. Incidentally, in the present specification, the term "lithium ion secondary battery" denotes a secondary battery using lithium ions as electric charge carriers, and implementing charging and discharging by transfer of electric charges accompanying the transfer of lithium ions between the positive and negative electrodes.

Figure 1:
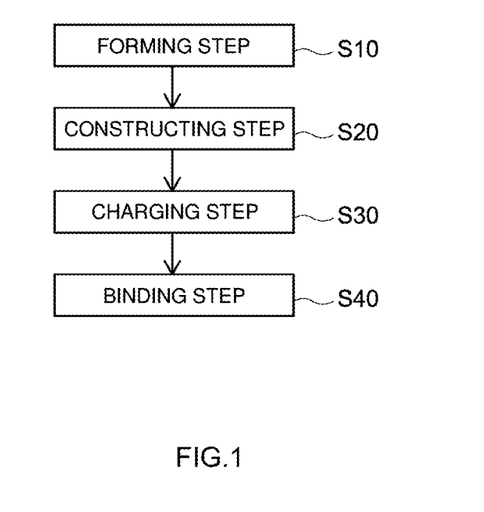
FIG. 1 is a flowchart showing each step of a method for manufacturing a lithium ion secondary battery in accordance with one embodiment.

As shown in FIG. 1, a method for manufacturing a lithium ion secondary battery (secondary battery) 100 (see FIG. 2) in accordance with present embodiment includes a forming step S10 of forming an electrode body 20, a constructing step S20 of constructing a battery assembly, a charging step S30 of charging the battery assembly, and a binding step S40 of binding the battery assembly.

First, the forming step S10 will be described. At the forming step S10, as shown in FIG. 3, a positive electrode sheet 50, a negative electrode sheet 60, and a separator sheet 70 are stacked one on another, thereby forming the electrode body 20.

Figure 3:
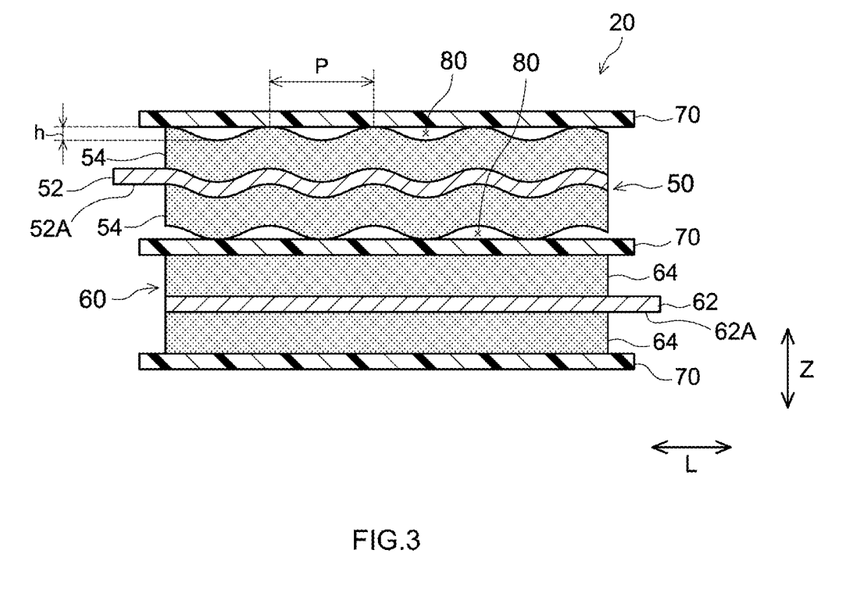
FIG. 3 is a cross sectional view showing a state of an electrode body before a constructing step in accordance with one embodiment.

As shown in FIG. 3, the electrode body 20 includes the long positive electrode sheet 50, the long separator sheet 70, and the long negative electrode sheet 60 stacked one on another therein. The electrode body 20 of the present embodiment is wound. Particularly, the positive electrode sheet 50 includes a long positive electrode collector 52, and a positive electrode active material layer 54 formed along the longitudinal direction L on one surface or both surfaces (in the present embodiment, both surfaces) of the positive electrode collector 52. The negative electrode sheet 60 includes a long negative electrode collector 62, and a negative electrode active material layer 64 formed along the longitudinal direction L on one surface or both surfaces (in the present embodiment, both surfaces) of the negative electrode collector 62. Exposed parts 52A and 62A are situated at the opposite ends in the direction of the winding axis of the electrode body 20, respectively. The exposed part 52A is a portion at which the positive electrode active material layer 54 is not formed, and the positive electrode collector 52 is exposed. Whereas the exposed part 62A is a portion at which the negative electrode active material layer 64 is not formed, and the negative electrode collector 62 is exposed. Incidentally, the electrode body 20 may be not a wound electrode body, and may be a laminated electrode body including a positive electrode, a negative electrode, and a separator stacked one on another therein.

For the positive electrode sheet 50 and the negative electrode sheet 60, the same ones as those for use in a conventional lithium ion secondary battery can be used without particular restriction. A typical aspect thereof will be shown below.

Examples of the positive electrode collector 52 forming the positive electrode sheet 50 may include aluminum foil. Examples of the positive electrode active material included in the positive electrode active material layer 54 may include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), and lithium transition metal phosphate compounds (e.g., $LiFePO_4$). The positive electrode active material layer 54 can include other components than an active material, for example, a conductive material and a binder. As the conductive materials, for example, carbon black such as acetylene black (AB), or other carbon materials (e.g., graphite) can be preferably used. As the binder, for example, polyvinylidene fluoride (PVDF) can be used.

Examples of the negative electrode collector 62 forming the negative electrode sheet 60 may include copper foil. As the negative electrode active material included in the negative electrode active material layer 64, for example, a carbon material such as graphite, hard carbon, or soft carbon can be used. Out of these, graphite is preferable. Graphite may be natural graphite or artificial graphite, and may be coated with an amorphous carbon material. The negative electrode active material layer 64 can include other components than the active material, for example, a binder and a thickener. As the binder, for example, styrene butadiene rubber (SBR) can be used. As the thickener, for example, carboxymethyl cellulose (CMC) can be used.

As the separator sheet 70, a porous sheet (film) made of polyolefine such as polyethylene (PE) or polypropylene (PP)

can be preferably used. Such a porous sheet may be of a monolayered structure, or may be of a laminated structure of two or more layers (e.g., a three-layered structure in which PP layers are stacked on the opposite surfaces of a PE layer). A heat resistant layer (HRL) may be provided on the surface of the separator sheet 70.

Figure 4:
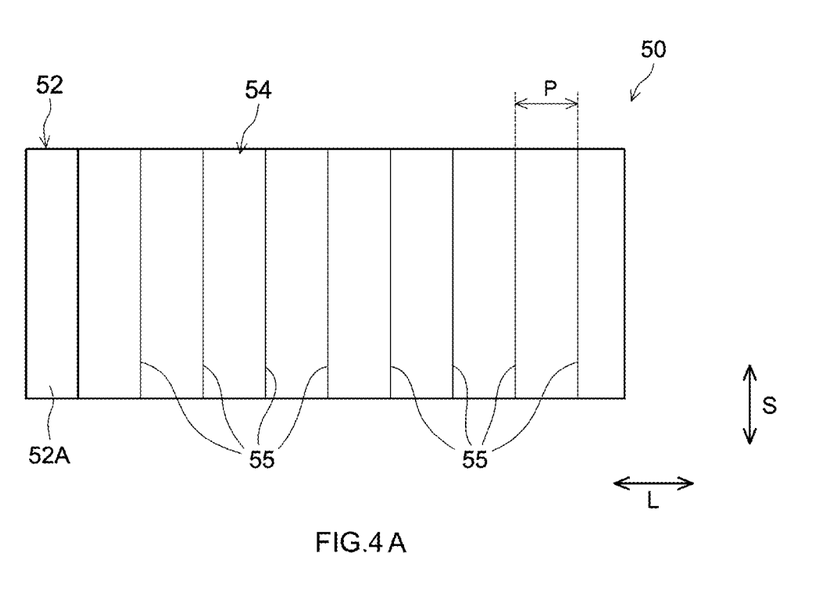
FIG. 4A is a plan view of a positive electrode sheet in accordance with one embodiment.
FIG. 4B is a plan view of a positive electrode sheet in accordance with another embodiment.
FIG. 4C is a plan view of a positive electrode sheet in accordance with a still other embodiment.
Figure 4B:
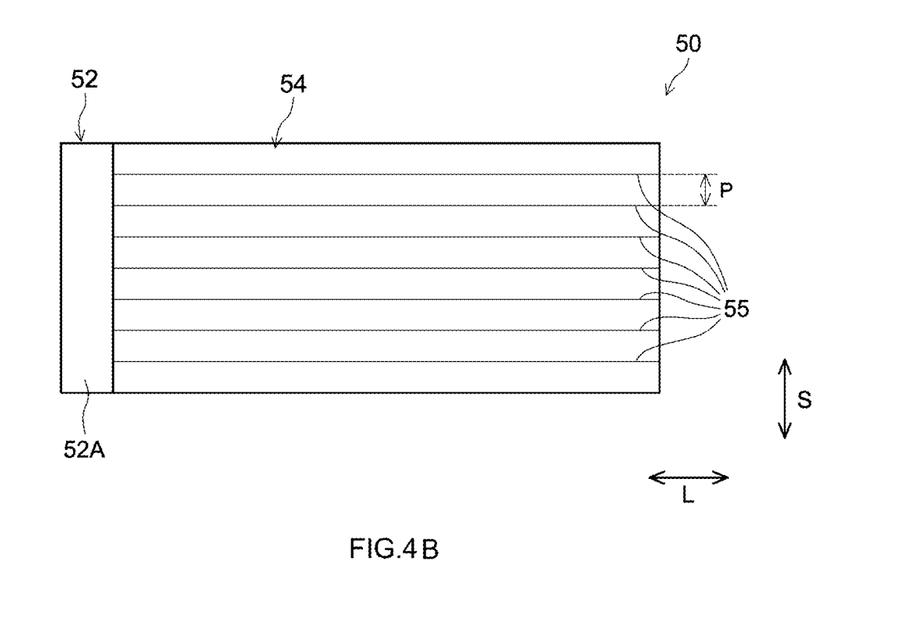
Figure 4C:
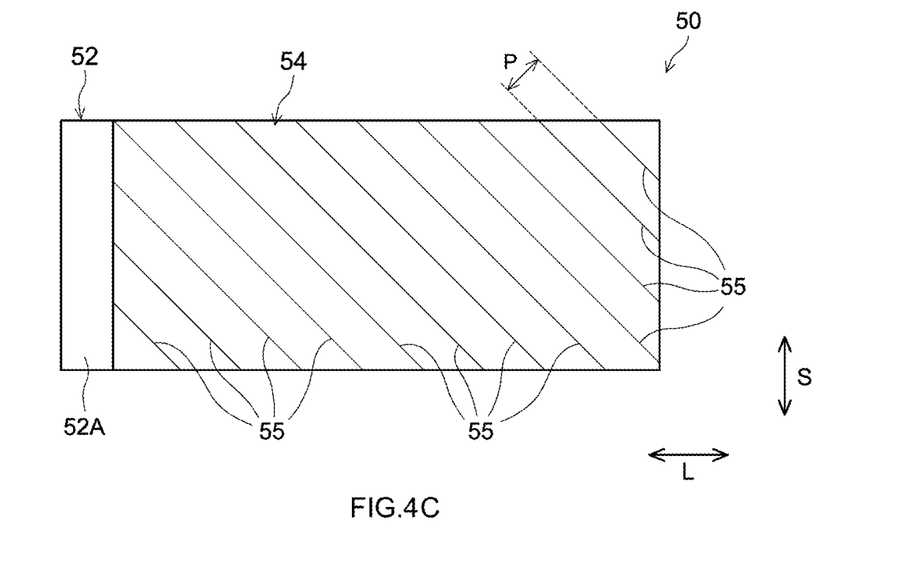

As shown in FIG. 3, the positive electrode sheet 50 of the present embodiment has an undulating shape in the stacking direction Z. More particularly, the positive electrode collector 52 and the positive electrode active material layer 54 of the positive electrode sheet 50 have an undulating shape in the stacking direction Z. The pit depth h of the undulation is 10 μm or more. The pit depth h of the undulation is preferably, for example, 40 μm or more and 100 μm or less. The undulating shape is formed in the following manner: for example, the positive electrode sheet 50 is passed between press rollers provided thereabove and therebelow, respectively; and the lower press roller is lifted upward for pressurization. The pit depth h of the undulation is the value which maximizes the difference between the dent part and the bump part of the surface when the undulating shape is measured by, for example, a laser displacement meter. The pit interval P of the undulation is, for example, 5 mm or more and 10 mm or less. The pit interval P of the undulation is the value which maximizes the interval between the bump part and the bump part of the surface when the undulating shape is measured by, for example, a laser displacement meter. The positive electrode active material layer 54 having an undulating shape is roughly constant in its thickness (height in the stacking direction Z) along the longitudinal direction L. As shown in FIG. 4A, with the positive electrode sheet 50 of the present embodiment, the bump part 55 in an undulating shape is formed in parallel with the transverse direction S (i.e., the direction orthogonal to the longitudinal direction L) of the positive electrode active material layer 54. Incidentally, as shown in FIG. 4B, the bump part 55 in an undulating shape may be formed in parallel with the longitudinal direction L of the positive electrode active material layer 54. Alternatively, as shown in FIG. 4C, the bump part 55 in an undulating shape may be formed in a manner inclined with respect to the longitudinal direction L and the transverse direction S of the positive electrode active material layer 54. Incidentally, there may be a plurality of directions of extension of the bump part 55 in one positive electrode sheet 50 (i.e., the composite type of FIG. 4A to FIG. 4C). As showing in FIG. 3, the positive electrode sheet 50 has the undulating shape. For this reason, with the positive electrode sheet 50 and the separator sheet 70 stacked one on another, a passage 80 for allowing the electrolyte (nonaqueous electrolyte 10) to pass therethrough is formed between the positive electrode active material layer 54 and the separator sheet 70. Incidentally, in the present embodiment, the undulating shape is present at least before the constructing step S20 (i.e., at least at the forming step S10 and the constructing step S20).

Then, the constructing step S20 will be described. At the constructing step S20, the electrode body 20 is accommodated in a battery case 30, and a nonaqueous electrolyte 10 is poured into the battery case 30 for constructing a battery assembly.

Figure 2:
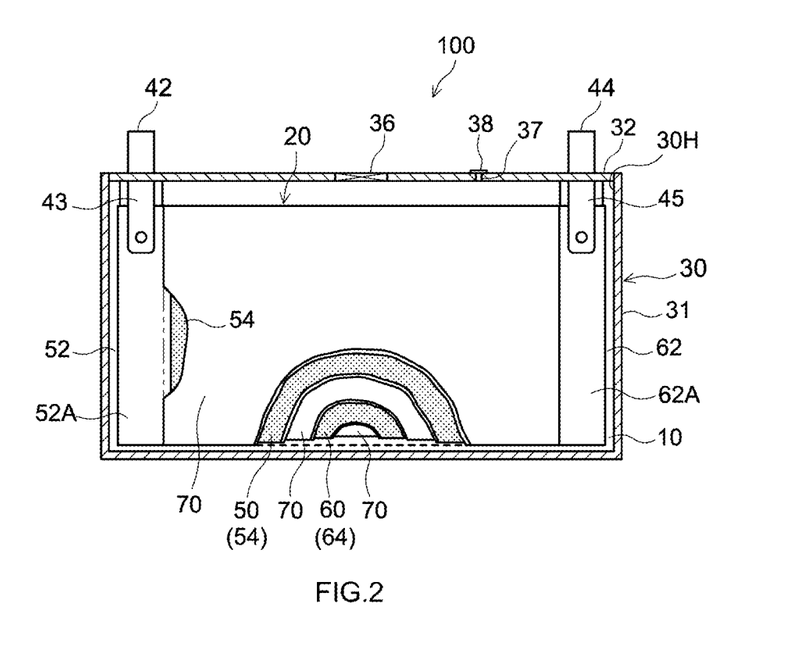
FIG. 2 is a cross sectional view of a lithium ion secondary battery in accordance with one embodiment.

As shown in FIG. 2, the shape of the battery case 30 is a flat square shape. The battery case 30 includes a box-shaped main body 31 having an opening 30H at one side surface thereof, and a sheet-shaped lid body 32 for closing the opening 30H of the main body 31. The lid body 32 of the battery case 30 is provided with a positive electrode external terminal 42 and a negative electrode external terminal 44 for external connection, and a safety valve 36. The safety valve 36 relaxes the internal pressure when the internal pressure of the battery case 30 increases to a prescribed level or higher. Further, the lid body 32 of the battery case 30 is provided with a solution pouring port 37 for pouring the nonaqueous electrolyte 10 into the battery case 30. As the material for the battery case 30, a material which is lightweight and has good heat conductivity is desirable. As one example, for the material for the battery case 30 of the present embodiment, aluminum having high heat conductivity and proper rigidity is used. However, it is also possible to change the configuration of the battery case 30. For example, as the battery case 30, a laminate having flexibility may be used.

At the constructing step S20, as shown in FIG. 2, the positive electrode collector terminal 43 is joined to the exposed part 52A of the positive electrode collector 52. The positive electrode collector terminal 43 is electrically connected with the positive electrode external terminal 42. The negative electrode collector terminal 45 is joined to the exposed part 62A of the negative electrode collector 62. The negative electrode collector terminal 45 is electrically connected with the negative electrode external terminal 44. The nonaqueous electrolyte 10 is poured into the inside (i.e., the main body 31) of the battery case 30 via a solution pouring port 37 formed in the lid body 32 of the battery case 30. Herein, as shown in FIG. 3, when the nonaqueous electrolyte 10 is poured into the battery case 30, a passage 80 for allowing the nonaqueous electrolyte 10 to pass therethrough is formed between the positive electrode active material layer 54 of the positive electrode sheet 50 and the separator sheet 70. For this reason, the poured nonaqueous electrolyte 10 passes through the passage 80, and is impregnated into the whole of the electrode body 20 rapidly. Upon pouring of the nonaqueous electrolyte 10 into the battery case 30, a sealing member 38 (see FIG. 2) is welded to the solution pouring port 37, thereby sealing the solution pouring port 37. As a result of this, a battery assembly is constructed. The nonaqueous electrolyte 10 generally includes an organic solvent (nonaqueous solvent) and a support salt.

As the nonaqueous solvents, known ones for use as a nonaqueous solvent of an electrolyte for a lithium ion secondary battery can be used. Specific examples thereof may include carbonates, ethers, esters, nitriles, sulfones, and lactones. Out of these, carbonates are preferable. Examples of carbonates (carbonate type solvents) may include ethylene carbonate (EC), propylene carbonate (PC), diethyl carbonate (DEC), dimethyl carbonate (DMC), and ethyl methyl carbonate (EMC). These can be used singly alone, or in combination of two or more thereof. The nonaqueous solvent dissolves a support salt (electrolyte).

The support salt is used as a main electrolyte, and for example, a lithium salt such as $LiPF_6$, $LiBF_4$, or $LiClO_4$ is preferably used. The content of such a support salt has no particular restriction unless the effects of the present disclosure are remarkably impaired. For example, when $LiPF_6$ is used as a support salt, the molar content of $LiPF_6$ is adjusted to 0.5 mol/L to 3.0 mol/L (preferably 0.5 mol/L to 1.5 mol/L, for example, 1 mol/L). By thus adjusting the content of $LiPF_6$ in the nonaqueous electrolyte, it is possible to achieve an appropriate balance between the total ion content in the nonaqueous electrolyte and the viscosity of the electrolyte. For this reason, it is possible to improve the input/output characteristic without excessively reducing the ion conductivity.

Then, the charging step S30 will be described. At the charging step S30, the battery assembly is charged. At the charging step S30, the battery assembly is charged until state of charge (SOC) becomes 100%. At the charging step S30, the battery assembly is charged, for example, from 3.7V to 4.2V.

Figure 5:
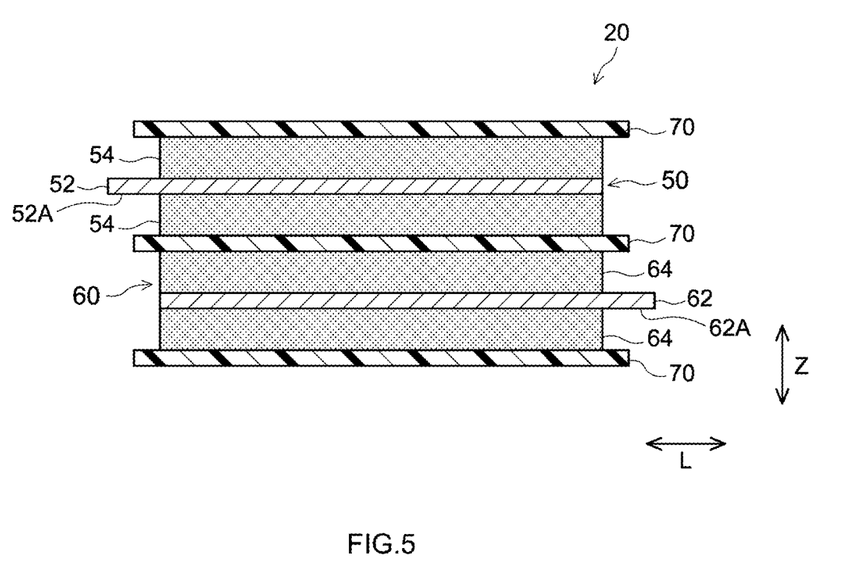
FIG. 5 is a cross sectional view showing a state of an electrode body after a binding step in accordance with one embodiment.

Then, the binding step S40 will be described. At the binding step S40, the charged battery assembly is bound under a prescribed pressure in the stacking direction Z. This results in a decrease in pit depth h of the undulation of the positive electrode sheet 50 (see FIG. 3) (e.g., a pit depth H of smaller than 10 μm). Preferably, the prescribed pressure is the pressure for flattening the surface of the positive electrode active material layer 54 having an undulating shape. As a result of this, as shown in FIG. 5, the pit depth h of the undulation of the positive electrode sheet 50 becomes substantially zero, so that the surface of the positive electrode active material layer 54 becomes flat. Namely, throughout the whole of the positive electrode active material layer 54, the positive electrode active material layer 54 and the separator sheet 70 are in contact with each other, which eliminates the passage 80 through which the nonaqueous electrolyte 10 can pass. Incidentally, the battery assemblies may be bound singly alone, or may be bound all together with the plurality of battery assemblies arrayed in the stacking direction (i.e., modularization).

Below, although test examples regarding the technology herein disclosed will be described, it is not intended that the technology herein disclosed is limited to the following test examples.

In the present embodiment, a positive electrode sheet was manufactured according to the following procedure. First, $LiFePO_4$ as a positive electrode active material, AB as a conductive material, and PVDF as a binder were weighed at mass ratios of 91:8:2, and were mixed/kneaded with NMP, thereby preparing a paste for a positive electrode. The paste was supplied to both surfaces of long aluminum alloy foil (thickness 12 μm) as a positive electrode collector with a coating width of 230 mm so as to achieve a coating weight per side of 20 $mg/cm^2$, and was dried, thereby manufacturing a positive electrode sheet including a positive electrode active material layer. The positive electrode sheet was passed between press rollers each with a roller diameter of 300 mm provided thereabove and therebelow, respectively at a transport speed of 2 m/min, and the lower press roller was lifted upward for pressurization, thereby forming an undulating shape in the positive electrode sheet. By appropriately changing the pressure to be applied by the lower press roller on the positive electrode sheet, the pit depth of the undulation was varied, and by appropriately changing the timing at which the lower press roller was lifted upward, the pit interval of the undulation was varied, thereby preparing a plurality of positive electrode sheets (Example 2 to Example 6). Herein, the bump part of the undulating shape was formed so as to be in parallel with the longitudinal direction L of the positive electrode sheet (see FIG. 4B). Incidentally, the positive electrode sheet in accordance with Example 1 is a positive electrode sheet including a flat positive electrode active material layer without an undulating shape. Then, the positive electrode sheets were each cut out to a width of 50 mm and a length of 100 mm, which was sandwiched between a pair of glass sheets. Then, one end of each positive electrode sheet sandwiched between the glass sheets was immersed in ethylene carbonate as a nonaqueous electrolyte. Then, the time until the nonaqueous electrolyte reaches the other end of each positive electrode sheet from the start of immersion (i.e., the solution impregnation time) was measured. The measurement results are shown in Table 1. Incidentally, in "Binding force for solution impregnation" and "Binding force for modularization" of Table 1, "Yes" represents that a binding force [MPa] for eliminating an undulating shape, and flattening the surface of the positive electrode active material layer is applied; and "No" represents that the binding force is not applied. Further, "Solution impregnation time" represents the proportion with reference to the positive electrode sheet in accordance with Example 1. Still further, for "Expansion rate", the thickness of the positive electrode sheet for modularization was measured, and the deviation rate between the accumulative thickness of the positive electrode collector and the positive electrode active material layer and the measured value was referred to as the expansion rate due to the undulating shape.

TABLE 1

|  | Example 1 | Example 2 | Example 3 | Example 4 | Example 5 | Example 6 |
| --- | --- | --- | --- | --- | --- | --- |
| Binding force for solution impregnation | No | No | No | No | No | Yes |
| Binding force for modularization | Yes | Yes | Yes | Yes | No | Yes |
| Pit depth of undulation h [μm] | — | 10 | 41 | 95 | 95 | 95 |
| Pit interval of undulation P [mm] | — | 7 | 8 | 7 | 7 | 7 |
| Solution impregnation time | 1 | 0.4 | 0.3 | 0.3 | 0.3 | 1 |
| Expansion rate | 1 | 1 | 1 | 1 | 1.2 | 1 |

As indicated in the Table 1, with the positive electrode sheets of Example 2 to Example 5, the solution impregnation time was 0.4 or less, and the nonaqueous electrolyte moved very rapidly in the positive electrode sheet. Namely, the impregnation rate of the nonaqueous electrolyte was fast. Incidentally, for the positive electrode sheet of Example 6, although the undulating shape is formed, binding during solution impregnation results in flattening of the undulating shape. As a result, the solution impregnation time became 1. The description up to this point has confirmed that the undulating shape is formed during solution impregnation, resulting in an increase in impregnation rate. Further, it has been confirmed as follows: when the pit depth h of the undulation is 40 μm or more, the solution impregnation time becomes 0.3, so that the impregnation rate is higher. Incidentally, it has been confirmed as follows: for the positive electrode sheet of Example 5, binding is not carried out during modulization, and the expansion rate is 1.2; accordingly, the passage capable of passing the nonaqueous electrolyte therethrough during solution impregnation is formed at the positive electrode active material layer.

Up to this point, specific examples of the technology herein disclosed have been described in details. However, these are merely illustrative, and should not be construed as limiting the scope of the appended claims. The technology described in the appended claims includes various modifications and changes of the specific examples exemplified up to this point.

In the foregoing embodiments, only the positive electrode sheet 50 had an undulating shape in the stacking direction Z. However, the negative electrode sheet 60 may also similarly have an undulating shape in the stacking direction Z. Namely, the negative electrode collector 62 and the negative electrode active material layer 64 of the negative electrode sheet 60 may have an undulating shape in the stacking direction Z. Alternatively, only the negative electrode sheet 60 may have an undulating shape in the stacking direction Z.

In the foregoing embodiments, at the charging step S30, charging of the battery assembly is performed with the positive electrode sheet 50 having an undulating shape. However, charging may be performed after binding the battery assembly under a prescribed pressure in the stacking direction Z, and eliminating the undulating shape of the positive electrode sheet 50.

What is claimed is:

1. A method for manufacturing a secondary battery, the method comprising:
   a forming step of stacking a positive electrode sheet including a positive electrode active material layer on a long positive electrode collector, a negative electrode sheet including a negative electrode active material layer on a long negative electrode collector, and a long separator sheet, thereby forming an electrode body;
   a constructing step of accommodating the electrode body in a battery case, and pouring an electrolyte into the battery case, thereby constructing a battery assembly; and
   a charging step of charging the battery assembly, wherein
   at least before the constructing step, at least any one of the positive electrode active material layer and the negative electrode active material layer has an undulating shape in a stacking direction, and
   a pit depth of an undulation of the undulating shape is 10 μm or more; and
   a binding step of binding the battery assembly charged under a prescribed pressure in the stacking direction, and reducing the pit depth of the undulation of the undulating shape.

2. The manufacturing method according to claim 1, wherein
   in the binding step, the prescribed pressure is a pressure for flattening a surface of the positive electrode active material layer and/or the negative electrode active material layer having the undulating shape.

3. The manufacturing method according to claim 1, wherein
   the pit depth of the undulation of the undulating shape is 40 μm or more.

* * * * *